United States Patent [19]
Lehto

[11] Patent Number: 5,019,360
[45] Date of Patent: May 28, 1991

[54] METHOD FOR THE PROCESSING OF FLY ASH, SCRUBBER SLUDGE AND THE LIKE; AND PRODUCT

[75] Inventor: John M. Lehto, Cokato, Minn.

[73] Assignee: Northern States Power Company, Minneapolis, Minn.

[21] Appl. No.: 535,998

[22] Filed: Jun. 8, 1990

Related U.S. Application Data

[63] Continuation of Ser. No. 464,584, Jan. 11, 1990, abandoned, which is a continuation of Ser. No. 124,664, Nov. 24, 1987, abandoned.

[51] Int. Cl.$^5$ ............................................. B01F 1/00
[52] U.S. Cl. ...................................... 423/132; 423/122; 423/127; 423/128; 423/129; 423/131; 106/DIG. 1
[58] Field of Search ............... 423/113, 131, 127, 132, 423/128, 331; 75/743, 745

[56] References Cited

U.S. PATENT DOCUMENTS

| | | | |
|---|---|---|---|
| 1,333,020 | 3/1920 | Halvorsen | 423/132 |
| 2,350,575 | 6/1944 | Tomlinson et al. | |
| 2,356,183 | 8/1944 | Shepard et al. | |
| 2,402,668 | 6/1946 | Roller | |
| 2,416,508 | 2/1947 | Barnes et al. | |
| 3,393,975 | 7/1968 | Mitchell et al. | 42/ |
| 3,484,196 | 12/1969 | Cohen et al. | 423/146 |
| 3,971,843 | 7/1976 | Helgorsky et al. | 423/181 |
| 4,039,615 | 8/1977 | Mikami et al. | 423/111 |
| 4,124,680 | 11/1978 | Cohen et al. | |
| 4,226,632 | 10/1980 | Kapolyi et al. | |
| 4,242,313 | 12/1980 | Torma | 423/132 |
| 4,252,777 | 2/1981 | McDowell et al. | |
| 4,301,125 | 11/1981 | Burkin et al. | |
| 4,397,822 | 8/1983 | Murtha | |
| 4,440,569 | 4/1984 | Wier et al. | |
| 4,567,026 | 1/1986 | Lisowyj | 423/132 |
| 4,581,207 | 4/1986 | Bush et al. | 423/127 |
| 4,652,433 | 3/1987 | Ashworth et al. | |
| 4,670,231 | 6/1987 | Garcia-Clavel et al. | 423/114 |

FOREIGN PATENT DOCUMENTS

| | | |
|---|---|---|
| 233434 | 6/1960 | Australia . |
| 054679 | 3/1967 | Fed. Rep. of Germany .... 23/110 R |
| 1592104 | 5/1972 | Fed. Rep. of Germany . |
| 2343341 | 3/1975 | Fed. Rep. of Germany ...... 423/128 |
| 95262 | 3/1932 | Japan . |
| 812721 | 3/1981 | U.S.S.R. ............................ 423/331 |
| 852798 | 9/1981 | U.S.S.R. ............................ 423/129 |
| 1093688 | 5/1984 | U.S.S.R. ............................ 423/129 |
| 300184 | 11/1928 | United Kingdom . |
| 369268 | 3/1932 | United Kingdom . |
| 1123184 | 8/1965 | United Kingdom ................ 423/122 |

OTHER PUBLICATIONS

Sulfuric Acid and Cement from Anhydrite, by John Manning, B. Sc., PhD., F.R.I.C.
M. Balasiewicz et al., "alumina from Non-Bauxite Ores by the Bretsznajder Sulfuric Acid Method", Chem. Abstr., 99, 118 (Abstract No. 40534c) (1983).
Translation of Melkonian et al., "A Method for Producing Clay Earth and Byproducts".
Translation of Kuettner et al., "A Method for Preparation of White, Finely-Divided Calcium Silicate".

Primary Examiner—Theodore Morris
Assistant Examiner—Ed Squillante
Attorney, Agent, or Firm—Merchant, Gould, Smith, Edell, Welter & Schmidt

[57] ABSTRACT

A method for the processing of fly ash scrubber sludge or the like is provided. The method yields unique products, including a usable calcium silicate material and a high purity alumina material. The process involves a plurality of stages including a first magnetic separation in an acid leach. During the acid leach, valuable mineral components are converted into soluble sulfates. The leach residue, containing calcium materials, is extracted with ammonia solution to yield a desirable calcium silicate product. The leach liquor is treated in a preferred manner to precipitate relatively acid free aluminum sulfate. The aluminum sulfate is then converted into a desirable alumina product.

5 Claims, 4 Drawing Sheets

METHOD FOR THE PROCESSING OF FLY ASH, SCRUBBER SLUDGE AND THE LIKE; AND PRODUCT

This is a continuation, of application Ser. No. 07/464,584, filed 1/11/90.

This is continuation, of application Ser. No. 07/124,664, filed 11/24/87 now abandoned.

FIELD OF THE INVENTION

The present invention relates to the processing of fly ash, scrubber sludge and similar materials. The invention particularly concerns a method whereby many of the components of such materials can be isolated and/or converted into useful products.

BACKGROUND OF THE INVENTION

As used herein, the term "fly ash" refers to the ash produced by and from the the combustion of powdered or other particulate forms of coal, such as in power station boilers or the like, and includes entrained ash from a gassifier. The term "scrubber sludge" includes the solid materials recovered from the combustion gases of coal, through conventional means such as smoke stacks, scrubbers and the like. Chemically, fly ash and scrubber sludge comprise very similar materials, except that scrubber sludge generally has a considerable amount of calcium sulfate in it, as a result of the limestone slurry typically used to react with sulfur dioxide in the gases. For the descriptions herein, "fly ash" and "scrubber sludge" will be understood to be interchangeable terms.

Fly ash and scrubber sludge are produced in great amounts almost any time coal is burned as a fuel, for example in thermoelectric power plants. Disposal of this material has been a considerable problem, and promises to be an ever increasing problem as a result of environmental restrictions, increasing costs of transport, the need for dumping sites and similar concerns. Generally, ash or sludge materials are wastes which in the past have had very little, if any, value or use, thus contributing to making disposal an economic burden and problem.

It has long been recognized that fly ash and scrubber sludge contain many potentially valuable mineral values. For example, typical fly ash includes a considerable amount of aluminum, iron, manganese, calcium, magnesium, titanium and potassium oxides therein. Further, small amounts of barium, cobalt, chromium, copper, gallium, nickel, lead, rubidium, strontium, zinc, zirconium, and other compounds have been found in fly ash. Typically, the most prevalent of these minerals is the aluminum value, which is sufficiently high to encourage the development of fly ash processing.

Numerous types of fly ash processing procedures have been developed, see for example McDowell et al. U.S. Pat. No. 4,252,777; Torma, U.S. Pat. No. 4,242,313; Murtha, U.S. Pat. No. 4,397,822; Mitchell et al., U.S. Pat. No. 3,393,975; Ashworth et al., U.S. Pat. No. 4,652,433; and British Patent 369,268, the disclosures of which are incorporated herein by reference. These and other processes generally focus attention on the recovery of alumina ($Al_2O_3$) from the coal waste product.

Conventional methods of processing fly ash have generally not been satisfactory for several reasons. First, the alumina isolated is often not of sufficiently high purity to have much value or use as a commercial product, without substantial further, potentially expensive, processing. Thus, the conventional processes have simply not been economically feasible. Secondly, a problem has generally remained as to the disposal of the bulk of the waste material, typically various silicates. This material still would have to be disposed of, as conventional methods of processing have not provided for the generation of good commercial products from this waste, i.e., products which have both a substantial use and a significant market value.

With respect to this latter problem, it is noted that it is not enough to simply develop a side product which arguably has a use. The reason is that unless the use is substantial, the market in that side product would rapidly be saturated by the very large amounts of compound generated from the processing of the millions of tons of fly ash produced from coal plants in the United States.

Another problem with conventional methods of processing fly ash is generally related to the problem of costs in large scale operations. Many methods require substantial calcining or kilning steps on large volumes of material. Such steps are energy intensive, and are thus relatively expensive. Further, processing may itself generate undesired waste products, such as waste gases or contaminated water or washing solutions. Unless the process either avoids these products, or provides a method for recapture or recycling, the process may not be economically feasible, or otherwise desireable. That is, the processing could end up expensive and without sufficient benefit to be worthwhile.

What has been needed, and has generally been lacking, has been a method of fly ash and scrubber sludge processing which accomplishes and/or provides the following:

1. Effective and efficient recovery of valuable mineral values, especially iron and aluminum values, in useful and desireable forms, and with desired purity.
2. A process which substantially reduces the volume of waste material to be dumped.
3. A process whereby the bulk, in terms of volume and weight, of the fly ash material is isolated as a useful product; and one potentially having reasonable market value and sufficient utility so as to not completely glut the market in that product, if produced in the very large scale quantities possible as a result of large scale fly ash processing.
4. A process that uses relatively high temperature kiln or calcining operations to a lesser extent than conventional processes, to avoid excessive energy demands. And,
5. A process which produces relatively little waste or product disposal or contamination problem.

OBJECTS OF THE INVENTION

Therefore, the objects of the present invention are: to provide an advantageous overall method for the processing of fly ash and scrubber sludge obtained from coal use; to provide such a method whereby the alumina values of the material processed can be recovered, relatively efficiently, as a highly pure alumina compound; to provide such a method whereby a large amount of the silica component of the fly ash, and preferably the bulk of the fly ash material, can be selectively isolated as a bright white material having commercial value; to provide such a method or process which in a preferred application avoids extensive kiln or calcining procedures on the large volume silicate component; to provide a preferred such process which takes advantage of ammonia extraction processes to generate unique advantages; to provide such an overall process which is relatively straight-forward to put into operation, which is efficient, and which is particularly well adapted for a proposed usage to process millions of tons of fly ash or scrubber sludge material, per year. Other objects and advantages of the present invention will become apparent from the following descriptions, taken in connection with the accompanying drawings, wherein are set forth by way of illustration and example various embodiments and applications of the present invention.

SUMMARY OF THE INVENTION

According to the present invention, large amounts of fly ash or scrubber sludge, from the burning of coal, are fully processed and utilized. The overall process may be viewed as involving numerous stages, each of which provides significant steps of importance to overall efficient and effective processing. A general summation of the various stages is as follows:

In a first stage (Stage 1), the fly ash and scrubber sludge is collected, classified, and is treated for the removal of magnetic components, typically magnetite ($Fe_3O_4$). The early removal of magnetite provides several important functions. First, the iron recovered has some commercial value. Secondly, its removal reduces contamination of other fractions, increasing their value.

In Stage 2, the remaining fly ash/scrubber sludge material is extracted to obtain the important mineral values, particularly aluminum, in solution and to separate from them the bulk silicates.

Stage 3 involves a unique processing of the sludge material, or bulk silicates, produced in Stage 2. As a result of the overall processing, and the particular Stage 3 processing described in detail below, the bulk silicates may be isolated as a unique, bright white, product. This product has many potential market uses, even in very high volume, including as a paper filler. As a result of the unique Stage 3 processing, a high volume of waste product is generally avoided. That is, a particular, specific, fault of previous methods is avoided, in that the silicate material is obtained in a form having significant and substantial use.

In Stage 4 the soluble material from the extraction of Stage 2 is treated to further isolate soluble aluminum from less valuable or less useful products. From the detailed description it will be understood that particular advantages to the present invention result from specific steps utilized in this stage.

Stage 5 concerns final processing of the soluble aluminum fraction from Stage 4 into a desireable, and reasonably valuable, alumina product.

The drawings constitute a part of the specification and include exemplary embodiments of the present invention, while illustrating various objects and features thereof. The drawings are generally schematic in character, and standard symbols are repeated throughout, to facilitate an understanding of the invention. While some pump systems, conveyor systems and the like are shown in the drawings, it will be understood that these may be located at a variety of positions, with the scheme shown being representational only.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various systems. Therefore, specific details disclosed herein are not to be interpreted as limiting, but rather as a basis for the claims and as a representative basis for teaching one skilled in the art to variously employ the present invention in virtually any appropriately detailed system.

Stage 1—Removal of Magnetite Component

Figure 1:
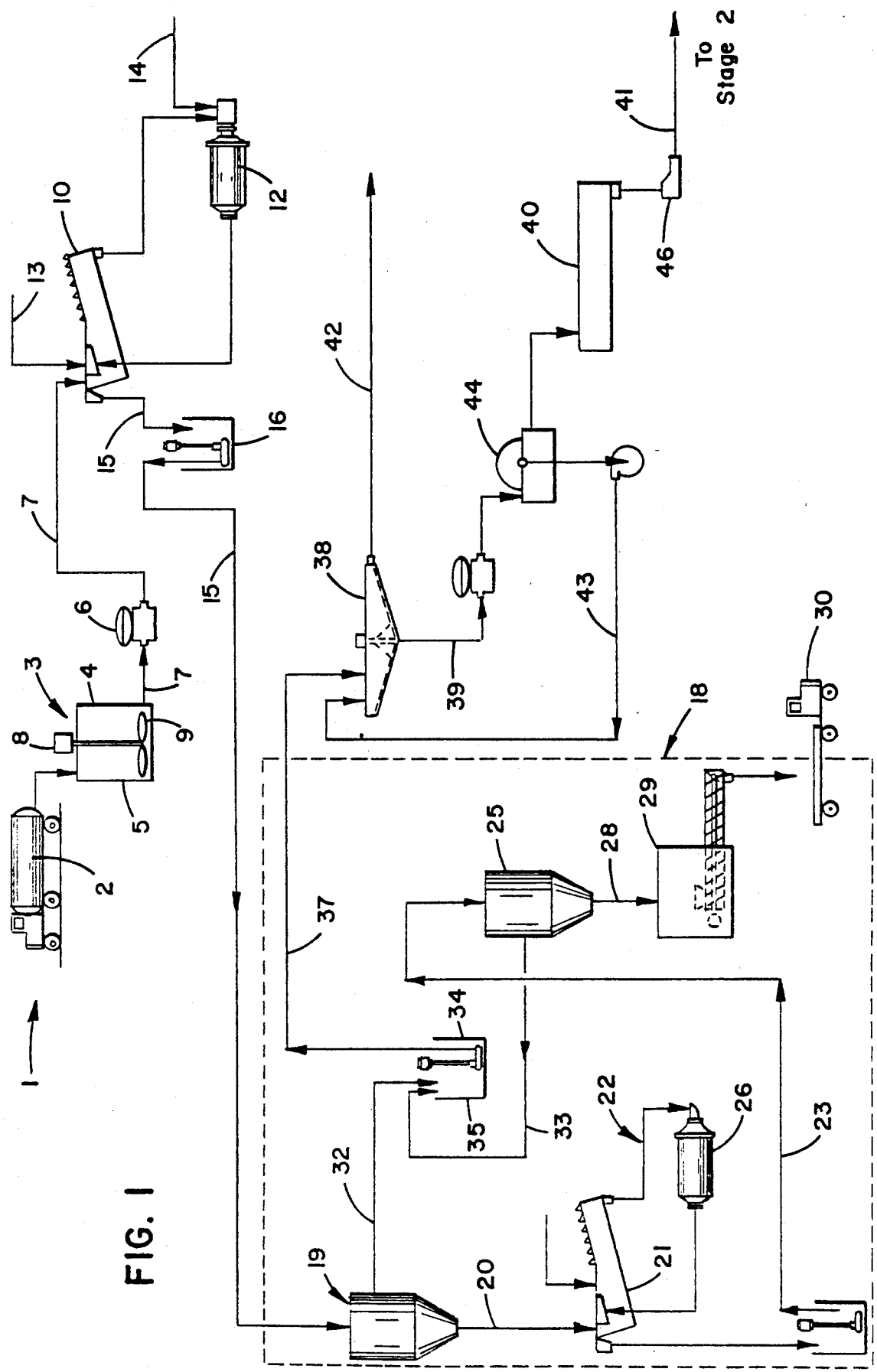
FIG. 1 is a schematic representation of Stage 1 according to a process of the present invention.

FIG. 1 generally presents a schematic representation of Stage 1 of the present invention. In Stage 1, fly ash and/or scrubber sludge undergo an initial processing in order to remove a magnetic component or fraction. The magnetic component (typically magnetite, $Fe_2O_3$) not only has some market value, but also its separation from the remainder of the fly ash/scrubber sludge is in a manner generating removal of much otherwise contaminating iron, which could cause problems at further stages.

Referring to FIG. 1, at reference numeral 1 a transport vehicle 2 is represented as transporting fly ash, scrubber sludge or a mixture thereof into the processing plant 3, specifically at agitator 4. The material transferred to agitator 4 may be dry, or it may be a sludge or slurry. Generally, if it is not received as a sludge or slurry, sufficient water is added at the receiving tank 5 of agitator 4, with agitation, to provide a sludge or slurry that can be readily pumped through the system, for example by pump 6 in line 7.

Agitator 4 is represented schematically as a chamber or tank 5 including an agitator system 8 operating with a powered propellor 9. A variety of such arrangements are known, and may be used in a system according to the present invention. In other places where an agitation tank or mixing chamber are represented in the Figures, similar symbols are used. It will be understood that at each point where one is desired, a variety of arrangements may be used, including ones that do not rely on a paddle for agitation.

Similarly, the symbol at reference number 6 is used in the Figures to generally represent a pump. A variety of pump systems may be used, and they may be located at different locations from the relative positions shown.

For typical processing, a first processing step in Stage 1 involves classification of the fly ash/scrubber sludge material to an appropriate size. In FIG. 1 this is represented by flow through line 7, to a spiral classifier 10. Classifier 10 may be of any of a variety of conventional types, and devices other than spiral-type classifiers can be used. Typically it is desired to accomplish, via classifier 10, a classification to a particle size of 200 mesh or less, in order for a later magnetic separation to be relatively efficient. In FIG. 1, loop 11 is shown transporting only that material found too large by the classifier 10 through a mill 12, with return to the classifier 10. As a result, with only relatively little power, virtually all fly ash and/or scrubber sludge material can be classified to 200 mesh or less. If necessary, additional water may be provided at the classifier 10, or the mill 12, by means of fluid lines 13 and 14, respectively. It is envisioned that for most applications mill 12 may be a relatively low powered ball mill, for example a small 50 horsepower ball mill.

Classified slurry is transported away from classifier 10 through line 15, flow being facilitated by a sump pump 16. It will be understood that a variety of flow generating means, including a variety of pump types, if desired, may be utilized in association with the methods of the present invention.

Line 15 transfers the classified material into a magnetic separator system 18. For the arrangement depicted in FIG. 1, the magnetic separator system 18 comprises a plurality of conventional magnetic separators, the first of which is represented at reference numeral 19.

Magnetic separator 19, as indicated above, may be a conventional separator, to which sludge from line 15 is transported. The magnetic component, generally magnetite, separated via magnetic separator 19 is transferred through line 20 to a classifier 21, having a mill loop 22 thereon, and through line 23 into a second magnetic separator 25.

For the preferred embodiment, at least one follow-up classifier 21 and mill loop 22, are used in order to classify the magnetic fraction to an even smaller size, preferably 300 mesh or less, to ensure substantial separation of the magnetic component from the non-magnetic component. By locating the smaller classifier 21 and mill loop 22 downstream from the first magnetic separator 19, energy is conserved. That is, rather than an initial grinding of all of the fly ash material to the smaller 300 mesh, for release of the magnetic fraction, only that portion which was retained by the first magnetic separator 19 is so classified. It will be understood that mill loop 26 may include a conventional mill, such as ball mill 26, therein to accomplish a sufficient grinding to release the iron particles which are otherwise bound in a matrix with non-magnetic fly ash material. Again, typically a classifying to 300 mesh or less leads to substantial release of the magnetic fraction from the non-magnetic fly ash material.

A second separation of magnetic material, from non-magnetic material, is accomplished through the second magnetic separator 25. The magnetic fraction is shown removed from magnetic separator 25 through line 28, into a storage bin 29 from which it can be removed for transport, for example by truck 30.

The non-magnetic fractions from magnetic separators 19 and 25 are shown mixed together through transport lines 32 and 33 respectively, into a collector 34 such as sump pump 35. This material is substantially free of magnetite, and thus much of the iron initially contained in the fly ash/scrubber sludge material. In Stage 1, the material is shown transported through line 37 to a thickener 38. Thickener 38 may be of a variety of conventional designs. The symbol used to represent the thickener is used elsewhere in the Figures to represent preferred points for location of such means.

The collected solids, pulled off through line 39, may be dried, if desired, in a conventional dryer 40, before being conveyed to Stage 2 through line 41. Fluid from the thickener 38 can be transported, as for example through line 42, to other steps in the process wherein the contaminated water can be used. In FIG. 1 the flow path of the collected solids from the thickener 38 and to the dryer 40 is shown as including a filter loop 43 therein, facilitating separation of contaminated water from the fly ash/scrubber sludge solids. The particlar filter loop 43 illustrated utilizes a conventional drum filter 44, used to accomplish the separation or filtration. It will be understood that a variety of material handling techniques may be utilized at this portion of the operation, the general goal being a desired separation of the contaminated fluid component from the solids, which are to be transported to Stage 2. In the schematic diagram of FIG. 1, transport to Stage 2 is illustrated by means of conveyor 46. The contaminated liquid is shown transferred back to the thickener, through line 43.

It will be understood that a variety of flow rates, sludge or slurry concentrations, classifier sizes, etc. may be utilized in a process involving Stage 1 according to the present invention. Generally these may be varied as desired, to yield effective separation of the magnetic component, and to provide a substantial amount of the processed fly ash/scrubber sludge material for Stage 2 processing. Rates will depend, in part, upon the amount of magnetite contained in the material to be processed. This varies considerably, depending on the source and grade of coal.

Stage 2 Extraction Of Mineral Values From The Ash/Sludge

In Stage 2, reference numeral 60 FIG. 2, the non-magnetic solid material from Stage 1 is extracted to obtain desired mineral values in solution, for later processing in Stages 4 and 5. Stage 2 is generally represented, along with Stage 3, in FIG. 2.

Figure 2:
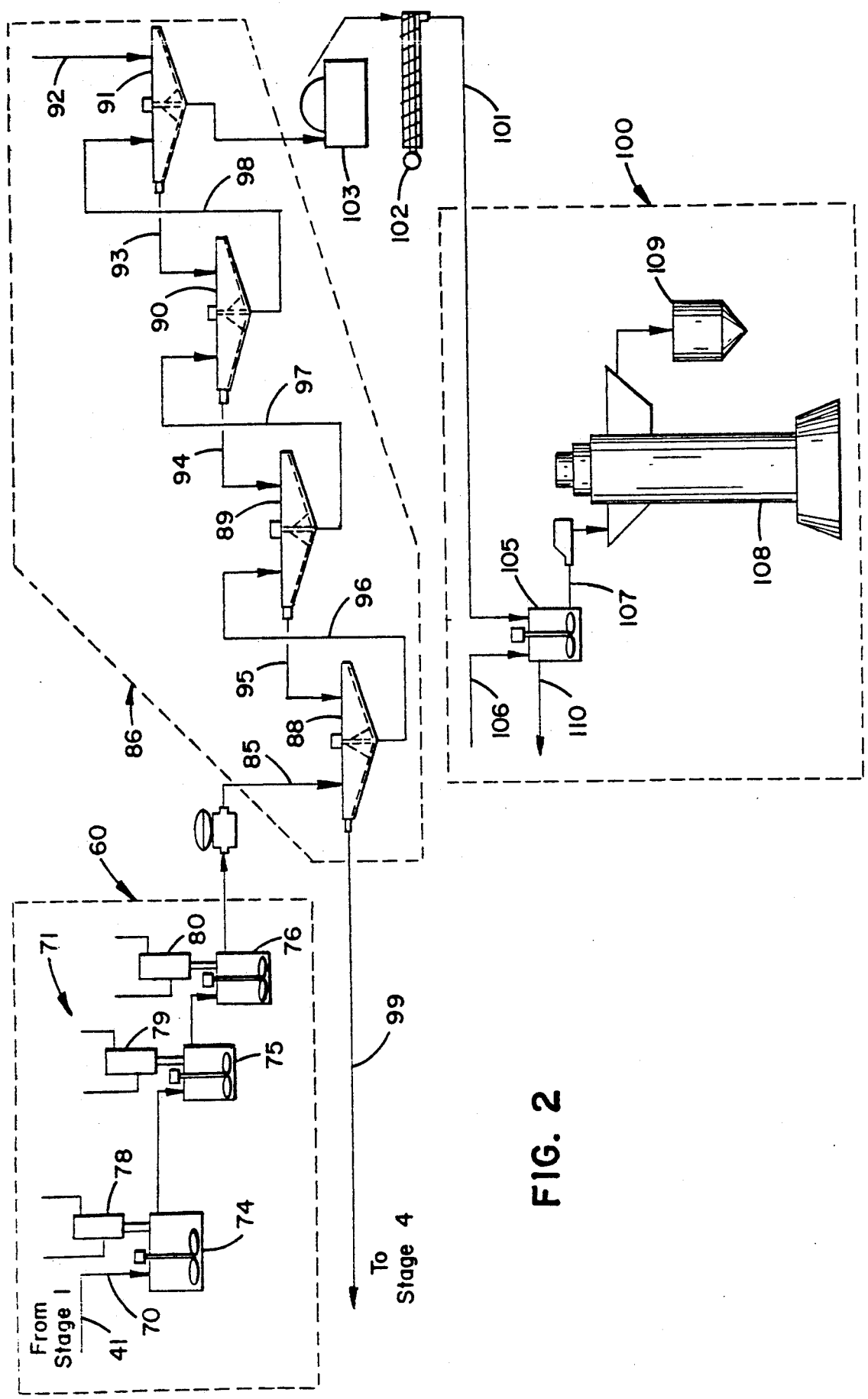
FIG. 2 is a schematic representation of Stages 2 and 3 of a process according to the present invention.

Referring to FIG. 2, transport of non-magnetic solid material from Stage 1 is generally designated at line 70. By conventional means, such as conveyors or the like, the material is transported into an extraction system 71, for the Stage 2 extraction of mineral values from the solid sludge material, into solution.

A variety of extraction means may be utilized in association with the general process of the present invention. A preferred and particularly effective extraction is with a highly concentrated sulfuric acid solution, at reflux. For the processing scheme illustrated in FIG. 2, extraction system 71 comprises a plurality of individual extraction chambers 74, 75 and 76, respectively, arranged in series. The extractions are preferably conducted with 60% sulfuric acid, at reflux, thus each chamber agitator 74, 75 and 76 is represented as fit with a reflux condensor 78, 79 and 80, respectively. The use of a plurality of extraction systems in series facilitates a continuous, rather than a batch, process. It will be understood, however, that a variety of arrangements may be used.

The hot leach solution, 80° C. or higher, generally contains various mineral values of the ash materials dissolved therein as sulfates. Premature precipitation will result, if the leach solution is cooled to much below 80° C.

Referring again to FIG. 2, Stage 2, the sludge material including the leach solution and sludge from the extraction system 71 is shown being pumped via line 85 through a separation system 86. Generally a variety of separation systems 86 may be utilized in association with the principles of the present invention, the primary purpose of the separation system 86 being to efficiently separate the hot acid solution from the non-dissolved sludge material. An operational system, for example, may include a plurality of filters.

A problem with using a plurality of filters, however, is that the hot acid solution is highly corrosive and thus damaging to many conventional filter arrangements. A preferred method of obtaining separation of the hot acid solution, with the mineral values dissolved therein, from the remainder of the sludge material, is through utilization of a separation system 86 including a counter-current/decant arrangement. Such a system is represented in FIG. 2 by a plurality of thickeners 88, 89, 90 and 91 in series. Throughout the thickening process, the leach solution is preferably maintained at about 80° C., to insure little, if any, precipitation. A counter-current wash is shown entering the system through line 92, and passing through lines 93, 94 and 95. The solids move from thickener to thickener through lines 96, 97 and 98, respectively. After passage through the plurality of thickeners, and with sufficient washing, the silicate solids will have been separated from the mineral sulfates dissolved in the leach solution. Referring again to the drawings, the filtrate, including the dissolved mineral values therein, is shown being transported to Stage 4 via line 99. The sludge material, on the other hand, generally comprising silicates, but with the soluble mineral values removed therefrom, is shown being transported to Stage 3, reference numeral 100, via line 101 by conveyor 102 after drying in drum filter 103. In Stage 3 the sludge material is converted to a useful, marketable product.

Again, it will generally be understood that various concentrations, flow rates, reaction times, etc. may be utilized in the process according to Stage 2 of the present invention. Generally what is required is an extraction method sufficient to ensure separation of the mineral values, especially the aluminum and any residual iron, from the sludge material. In this manner, the final silica product from Stage 3 can be obtained in a desired form, and further the more valuable mineral values can be collected in Stages 4 and 5 as described below. Hot 60% sulfuric acid provides for an efficient extraction, providing the leach solution is maintained at least at 80° C. or better during filtration or thickening.

Stage 3—Processing Of The Bulk Silicate Sludge Material From Stage 2 Into A Desired Product It is a particular advantage of the present invention that the large bulk of material in the sludge from the extraction step, Stage 2, can be processed to a desirable, useful, product. In many prior processing methods, this material was waste and provided a disposal problem. In other systems, processing of this material to an arguably useful product might have been possible, but would not have been cost effective. The two primary reasons for this were generally: the amount of energy consumed during the conversion; and, the likelihood that whatever product was developed would be made in such huge quantities that no practical use of it was possible. Processing according to the present invention generally alleviates these concerns.

Specifically, it has been found that a particularly desired form of calcium silicate, $CaO \cdot nSiO_2$, can be formed. In particular, the desired form is a bright white powder which can be used in a variety of applications. For example, the material can find heavy use in the paper filler industry, due to its bright white character and finely powdered form. Also, it may be used as a filler in various paints, adhesives or plastics. It is particularly important for such applications, however, that the calcium silicate formed be obtained in a bright, white, form, something previously not readily possible.

Obtaining the bright white material generally requires the following:
1. An assurance that certain contaminating minerals, particularly iron, are not present in substantial amounts.
2. Ensuring that carbon, which generally leads to discoloration, is not present in any substantial amount.
3. Providing that during the processing of Stage 3, a relatively fine powder is maintained, so that discolored material is not trapped in cakes or the like.

Conventional processing of fly ash material has generally involved a calcining or kiln treatment of silica material. During such a treatment sulfur dioxide is generally driven off in an oven, and calcium silicate is formed. Typically a reducing atmosphere, such as from a coal gas or the like, is required.

There are numerous problems when such a system is applied in practice. For example, such a system is energy intensive, since large amounts of fuel may be required to maintain the kiln at an appropriate temperature for reaction. Also, the high reaction temperatures generally result in formation of an agglomerated, rather than finely powdered, product. If this material were to be of any particular value, as a paper filler for example, even if it could be obtained bright white it would still have to be extensively crushed, another energy intensive step especially since the heat fused masses can be quite hard. Also, the waste gases from the kiln, typically sulfur dioxide, pose an environmental problem and may result in the development of even further undesired waste products, if a scrubber is used.

Significantly, it is also difficult to obtain a bright white product via a calcining or kiln-type treatment. One reason for this is that the presence of a reducing atmosphere such a coal gas is typically counter-productive with respect to achievement of this goal. Further, many prior processing techniques have not involved sufficiently effective separations in previous steps, to ensure that relatively little mineral material, such as iron, is still present in the silicate material. The problem with this is that iron can lead to discoloration, and thus an undesired product.

Conditions of a kiln may be carefully controlled, in some instances, in a manner yielding a bright white product. However, this processing would still be less than preferred due to many of the other factors listed above including energy consumption, waste product problems, agglomeration problems, etc. Further, generally the white product can only be consistently obtained with very careful, and often continuous, control and adjustment to the calcining process, something which is difficult and undesirable. Also, reproduceability in obtaining the white product is a problem.

It is a particular advantage of the present invention that an alternative to the kilning or calcining treatment is provided; the alternative leading to a bright white, desirable and marketable product with a high degree of efficiency, regularity and reproduceability. This preferred treatment, for Stage 3, involves an ammonia leaching of the sludge material derived from Stage 2.

The chemical process to be conducted during a preferred application of Stage 3, is a removal of the sulfate component from the sludge. Again, the conventional method was through application of heat to drive off sulfur dioxide and form calcium oxide from the calcium sulfate component; calcium sulfate being the primary component of the sludge. For the ammonia leaching, advantage is taken of the fact that sulfates are soluble in ammonium carbonate.

In Stage 3, reference numeral 100 FIG. 2, a leach tank 105 is provided, into which the sludge material is directed via line 101. An ammonia solution is directed into the leach tank, as for example through line 106. With agitation, and the application of heat if desired, an effective leach leading to the removal of the sulfate component as ammonium sulfate is accomplished. Typically, the ammonia leach can be conducted effectively with a moderately concentrated ammonium carbonate solution.

The solid material, after leaching or washing, is recovered as a relatively fine, bright white, powder, usable as above described. The ammonia leach solution includes a substantial amount of ammonium sulfate dissolved therein. The ammonium sulfate may be recycled, i.e., converted back to a basic ammonium solution, if desired for further use. Also, ammonium sulfate has some market value, for example as a fertilizer. Thus, the ammonium sulfate can be precipitated, washed and recovered as a marketable product.

Referring to FIG. 2, the solid product from the ammonia leach is shown drawn off through line 107. If necessary, it is passed through a mill 108, is dried, and it is stored in hopper 109 for later handling. The liquor from extraction chamber 105 is shown drawn off through line 110. Even if some grinding at mill 108 is necessary, the process is still advantageous when compared to calcining. Not only is a white product reproducibly formed, but high energy consumption in the kiln is avoided, and, the grinding step is easier since a heat-fused kiln product is not used.

After Stage 3 processing, a high volume of useable material is developed. Thus, as a result of the present invention, an otherwise waste sludge material has been converted, effectively, to a marketable product, eliminating or at least substantially reducing disposal problems and allowing for economic advantage.

Stage 4—Initial Processing Of The Leach Liquor Including Aluminum Sulfate And Other Metal Sulfates Therein As previously indicated, the primary valuable mineral constituent of fly ash material is the aluminum component. However, a number of other metals are included in the fly ash material, including iron, magnesium and the like. While much of the iron material is removed during the magnetic separation, a considerable amount of it still remains, contaminating the aluminum component. Further, other metals, such as magnesium, pose a problem to isolation of the alumina in a desired, usable, valuable and highly pure form. Stage 4 of the present invention relates to an initial processing of the leach liquor, from the acid leach of Stage 2, to yield separation of the less desired mineral values from the aluminum. Stage 5 concerns final processing of the aluminum component, to obtain a high purity alumina product. This product is of higher purity than typically possible from previous fly ash processing, without follow-up purification steps.

Figure 3:
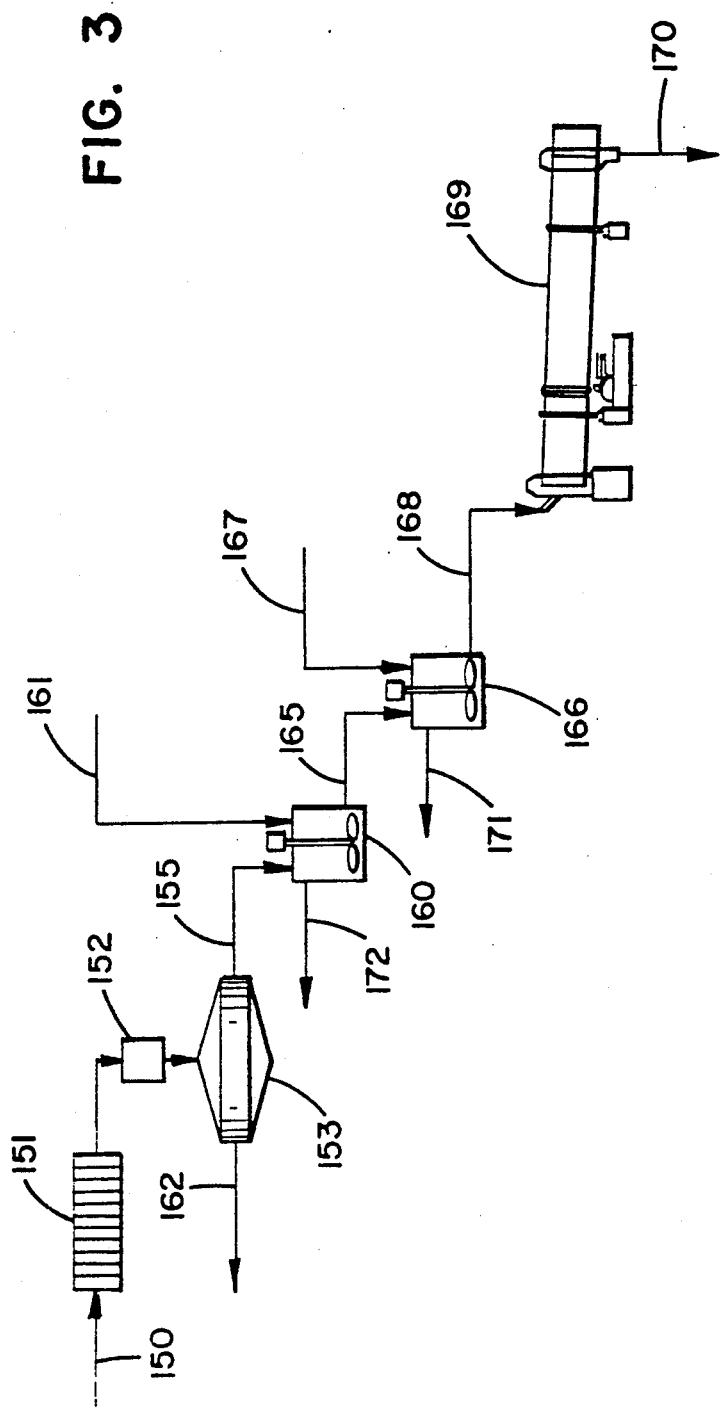
FIG. 3 is a schematic representation of Stage 4 according to the present invention.

Stage 4 of the present invention is generally represented as beginning in FIG. 3. Referring to FIG. 3, hot acid filtrate, from Stage 2 (line 99 of FIG. 2), is shown entering Stage 4 via line 150. During an initial step, a final polishing of this filtrate is accomplished, if desired, by passing the filtrate through a polishing filter 151, before directing same into a crystallizer 152. Precipitate from the crystallizer is isolated by means of centrifuge 153. It will be understood that the crystallizer 152 and centrifuge 153 association may be any of a variety of conventional arrangements, or arrangements yet to be developed.

In crystallizer 152, the filtrate is cooled, preferably to about 10° C., so that the various metal sulfates, including aluminum sulfate and magnesium sulfate, readily precipitate out of solution. A plurality of crystallizing chambers may be utilized in association with one another, not shown, in a conventional manner to insure substantially complete precipitation.

Precipitation of the solids from the acid solution is relatively straight-forward. However, at this stage a major problem, for large scale production, needed to be overcome. In particular, aluminum sulfate, i.e. $Al_2(SO_4)_3$ precipitates with a very high amount of water, typically 18 waters of hydration, associated therewith. Even with excessive washing, a considerable amount of acid is retained in this solid.

Thus, the crude precipitate product is undesired for numerous reasons including: that it comprises a mixture of aluminum and other materials; that it includes a high amount of water of hydration; and, that it includes a substantial amount of acid. While the waters of hydration and some of the acid might be lost through conventional chemical treatments and/or drying procedures, such procedures are undesirable for numerous reasons including:

1. The fact that procedures to drive off the water generally require large amounts of heat, and thus are subject to the problems of substantial expense and waste products from heat-generating materials, such as the burning of coal; and 2. The problem of contamination of the aluminum, with other minerals, remains.

Two basic methods have been developed according to the present invention to yield a desirable precipitation of substantially acid-free material, at this stage. The first method involves ethanol precipitation, and the second an ammonium extraction. The ethanol precipitation is the alternative discussed first.

A. Ethanol Precipitation

Generally, an ethanol precipitation procedure, utilized to remove excess acid from the solid precipitate with acid therein, is accomplished in a rather straight-forward manner. The precipitate from the cold acid solution is washed thoroughly and is dissolved in a minimal amount of hot water. This solution is then mixed with an ethanol solution in a crystallizing chamber. It has been found that precipitation induced in the presence of alcohol, particularly ethanol, generates a precipitate having relatively little acid associated therewith. A plurality of ethanol precipitations, and washing steps, may be used to insure substantially complete precipitation of the solids without substantial amounts of acid associated therewith. The water/acid/ethanol runoff can be readily treated and recycled, as for example through a low energy still or the like. It will be understood that this method of processing does not lead to complete separation of the aluminum from the other metals, at this point. That is, some other metals are present in the precipitated material. However, selective precipitation techniques, discussed below, can be used to remove the aluminum component, typically by pH control.

While the alcohol precipitation process is effective, it is less than completely desirable for numerous reasons. For example, it requires large amounts of alcohol, which results in considerable expense. Further, careful concentration, pH and/or temperature control may be required. However, if the desired final product of aluminun is $Al_2(SO_4)_3$, the alcohol precipitation technique may be of advantage.

B. Isolation of Substantially Acid-Free Precipitated Sulfates Via Ammonium Extraction According to preferred applications of the present method, a unique process is provided at this stage of fly ash processing, to achieve precipitation of a desired, substantially acid-free material. In particular, the mixture of precipitates, with acids therein, from the acid leach described above are treated as shown in FIG. 3. Specifically, the product material from the crystallizer 152 is dissolved in a minimum amount of hot water and is transferred via line 155 to an agitation chamber 160, in which the ammonia treatment is to take place. An ammonium solution is transferred into tank 160 via line 161. The ammonium solution may be prepared from the dissolving of ammonium carbonate, in water, in a conventional manner. The water/acid solution from centrifuge 153 is shown removed via line 162. It may be recycled to the counter-current decant system 86 if desired.

The result is the formation of solid aluminum hydroxide, magesium hydroxide, and other metal hydroxides, which precipitate out of solution, and the formation of a liquid having ammonium sulfate dissolved therein. A conventional separation technique such as through filtration or centrifugation can be used to separate these materials. The result, as indicated in FIG. 3, is the provision at reference numeral 165 of a solid component comprising aluminum hydroxide, magnesium hydroxide and the hydroxides of the other metals. These materials are transported into agitation chamber 166 and are treated with a sodium hydroxide solution entered via line 167. As a result, the aluminum is taken back into solution, in a relatively pure form, as sodium aluminate. The remaining metals, especially magnesium, are left as solid precipitates, and thus are readily removed by conventional filtration or centrifugation techniques. In FIG. 3, these precipitates are shown being taken off through line 168 for conventional processing at 169 into various forms, typically oxides through heating or the like. The kiln product is taken off at line 170. Only a relatively small volume of oxides is involved, even if a high volume of fly ash is processed, so the use of the kiln 169 does not pose a substantial energy or pollution problem.

Typically, the solid material taken off by line 168 and treated at process step 169 comprises a mixture of light metal oxides, of minimal commercial value. However, generally they can be used, and even if they cannot they are obtained in such small amounts that waste disposal is typically not much of a problem. The primary goal of Stages 4 and 5 is to isolate the more valuable component, alumina, in a substantially pure form. This occurs in Stage 5. Referring to FIG. 3, the sodium aluminate liquor is shown being taken from agitation chamber 166, for transportation to Stage 5, at line 171. Reference numeral 172 designates the takeoff of the liquor from the ammonia treatment.

Stage 5—Isolation of Relatively Pure Alumina

Figure 4:
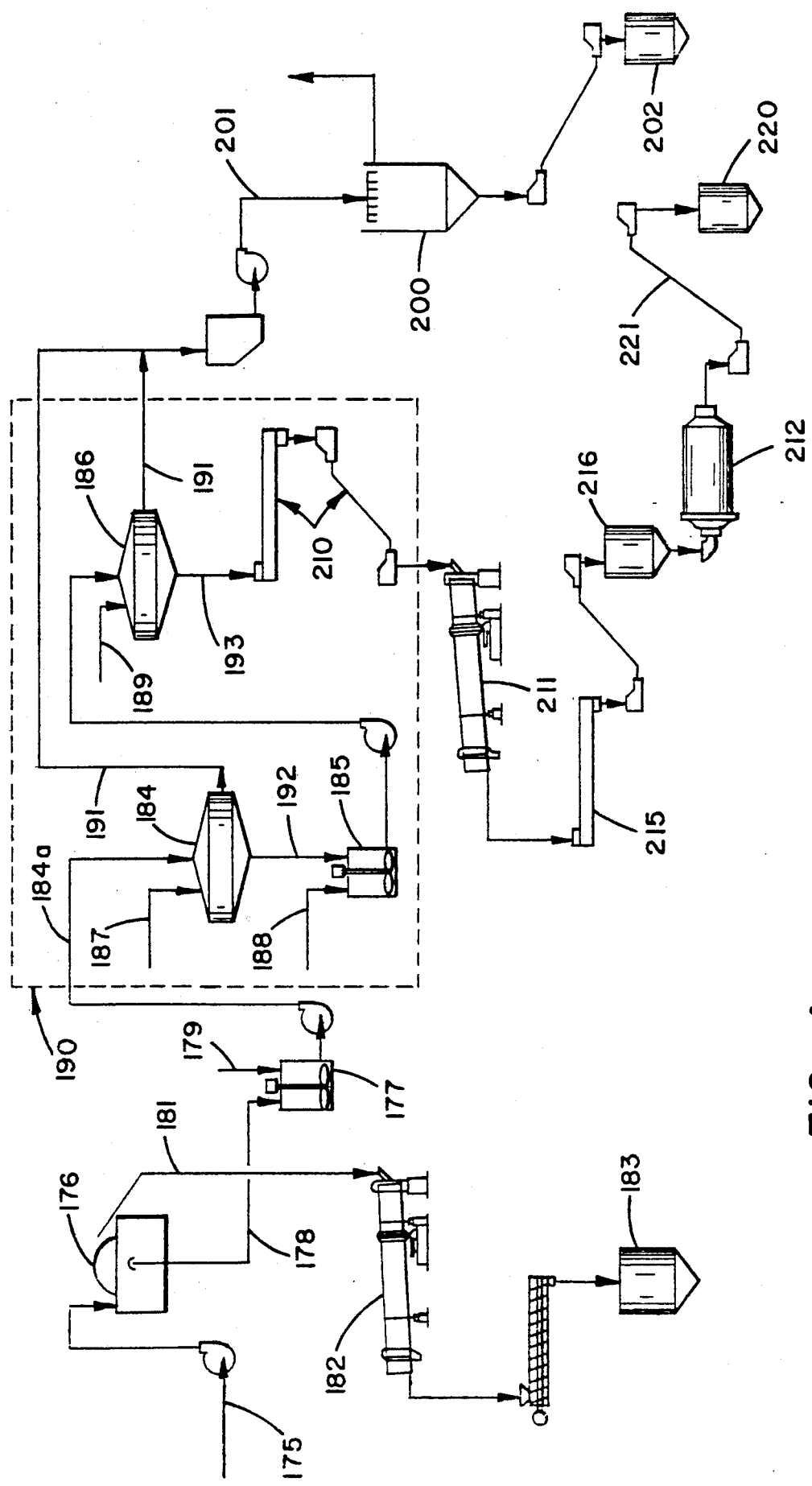
FIG. 4 is a schematic representation of Stage 5, and a portion of Stage 4, according to the present invention.

Reference numeral 175, FIG. 4 generally designates the flow takeoff from chamber 166, including dissolved therein sodium aluminate formed from sodium hydroxide addition. The dissolved sodium aluminate solution is transferred through filter 176 for removal of iron, magnesium and other metal hydroxides. The filtered solution is directed into chamber 177, via line 178, wherein pH is adjusted, preferably to about 6. This pH adjustment may take place by the addition of proton-donating acids, such as sulfuric acid. However, other acids may be used. A preferred method of adjusting the pH is through addition of carbon dioxide to the solution, by bubbling therethrough or similar methods. Reasons for this include that problems of the handling of strong acid are avoided at this step and there is a reduction of the amount of sulfate in the product. Further, the side product sodium carbonate is easily handled. The acid is introduced into tank 177 via line 179.

The solids from filter 176 are transported via line 181 to kiln 182. Kiln 182 may be the same as kiln 169, for efficiency. The solid product from the kiln 182 is stored in bin 183.

The material from chamber 177 is transported into centrifuge or precipitator 184, via line 184a. In the centrifuge 184 (and any associated precipitator, not shown) the solution is cooled, and the aluminum hydroxide is precipitated. For the embodiment shown and described, precipitator 184 forms part of an overall precipitation system 190 comprising a plurality of precipitation loops to obtain the aluminum hydroxide in a fairly clean form. For example, the solids from precipitator 184 are redissolved at tank 185 and are reprecipitated at precipitator 186. Lines 187, 188 and 189 provide for solvent input; lines 191 for fluid takeoff; and; lines 192 and 193 for product takeoff. It will be understood that precipitators 184 and 186 may be centrifuge arrangements; refrigerated precipitation chambers; or may be some combination of those types of systems.

The filtrate from the precipitations, including sodium carbonate and sodium sulfate in solution, are shown being transferred to a dryer 200 through line 201, whereat the salts are isolated and transferred to holding bin 202.

The more important product at this stage, the aluminum hydroxide, is transported by conveyor system 210 to a kiln apparatus 211, whereat it is baked and converted to alumina ($Al_2O_3$). Any of a variety of conventional kilns may be used, including rotary or pendulum kilns. The material from the kiln may be ground, if necessary, in ball mill 212 and sold as a commercial product. The alumina isolated via the overall process described is of very high purity, 99% or greater, and thus may be very desirable as a commercial product. Generally, it is far better than the alumina isolated from previous known fly ash processing techniques, especially at large scale.

Referring to FIG. 4, transfer of product from the kiln 211 to the ball mill 212 is accomplished via conveyor system 215 and bin 216. The final product is shown deposited in holding bin 220, via conveyor system 221.

Further important aspects of the present invention will become apparent from the following experimental descriptions of laboratory tests conducted to examine various steps or stages of the overall process.

Experiment 1—Sample Preparation: Separation of Magnetics

Raw sludge from a scrubber was combined with water at 66% solids, and charged into a ball mill. The slurry was ground for 10 minutes to break down lumps and scrubber scale. The mill discharge was passed through a magnetic separator. The magnetics and non-magnetics generated were wet screened at 200 mesh. The magnetic fraction (over 200 mesh) was returned to the ball mill and was reground until all of the pulps were smaller than 200 mesh. The minus 200 mesh fraction generated was returned to the magnetic separator and the magnetics were removed. The non-magnetics from the second magnetic separation were combined with the rougher non-magnetics, and were dried and split into 1500 g charges for leaching.

The two fractions collected, magnetic and nonmagnetic, were as follows:

TABLE I

| Product | Wt % | −500 mesh Wt % | Analysis (by weight) | | | |
|---|---|---|---|---|---|---|
| | | | Fe | Al | S | Mg |
| Non-Magnetics | 98.28 | 70.7 | 1.19 | 7.8 | 5.9 | 1.5 |
| Magnetics | 1.72 | — | 58.44 | — | — | — |

Experiment 2—Leaching of Mineral Values

A non-magnetic fly ash/scrubber sludge material was analyzed and found to include 1.8% iron, 7.0% aluminum, 1.59% magnesium, 6.20% sulfur, 17.0% silicate, 11.6% calcium, 2.0% sodium, 0.32% titanium, 0.44% barium, 0.063% manganese, and 0.26% potassium. For each leaching test, a 1500 g. sample of the material (minus 200 mesh, low intensity non-magnetic fraction) was placed in a 12,000 ml 3-neck round bottom flask. Leach solution (6.272 liters) containing 60% sulfuric acid by weight was added to the flask. The slurry was stirred with a Teflon ® paddle attached to a glass rod driven by an electric motor. The slurry was heated with an electric heating mantle. Leaching was carried out under refluxing conditions (130° C.) for a period of 2 hours. At the end of the 2 hour leach cycle, slurry was discharged from the flask into a Buechner funnel. The solution was vacuum filtered from the residue, and the volume measured. The residue was repulped with 1.5 liters of wash solution and was refiltered. Three slurry washings were conducted on each leach residue. All wash solution volumes were measured and held separately for the next leach cycle. The leach residue was dried at 82° C. for 24 hours, weighed, pulverized in a mortar, and analyzed. The pregnant leach solution was cooled to approximately 16° C. for 16-24 hours. The aluminum sulfate crystals generated were vacuum filtered from the supernatant solution and were stored for further testing. Supernatant volume was measured and a sample removed for analysis. The balance of the supernatant was held for use in the next leaching cycle.

The initial leach solution for each of the reported five-cycle tests was prepared by adding 2.872 liters of sulfuric acid to 3.4 liters of deionized water. Subsequent leach solutions were made up of supernatant and wash No. 1 solution from preceeding leach cycles, plus sufficient fresh acid and deionized water to produce a 60% by weight solution of 6.272 liters.

Wash solutions were advanced during the leaching campaign, i.e. wash solution 3 from test 4 became wash solution 2 for test 5 etc.

The following table summarizes the results of five tests, six cycles each, performed on non-magnetic sludge material.

TABLE 2

| Test | Distribution % | | | | Residue Analysis % | |
|---|---|---|---|---|---|---|
| | Extract | | Residue | | | |
| | Al | Fe | Al | Fe | Al | Fe |
| A | 68.33 | 77.26 | 31.67 | 22.74 | 2.46 | 0.30 |
| B | 68.49 | 77.77 | 31.51 | 22.23 | 2.42 | 0.29 |
| C | 67.69 | 80.75 | 32.31 | 14.25 | 2.47 | 0.25 |
| D | 68.20 | 80.97 | 31.80 | 19.03 | 2.46 | 0.25 |
| E | 71.80 | 85.60 | 28.20 | 14.40 | 2.55 | 0.27 |
| Average | 68.90 | 80.47 | 31.10 | 19.53 | 2.47 | 0.27 |

At the end of 6 cycles of leaching, 79% of the aluminum and 64% of the iron in the feed was leaving the circuit in the crystals and residue. Testing indicated that the ultimate aluminum recovery as crystals from the leaching is in excess of 71%. Recycling of solutions does result in a slight increase of aluminum and iron in leached residue. Further testing suggested no significant change in metal extraction occurring as a result of injected air in the leach slurry.

Experiment 3—Treatment of Leach Residue

Calcining leach residue for sulfur removal has generally produced erratic results, as discussed previously. Sulfates, however, are soluble in ammonium carbonate solution.

For the sulfate leaching test, 400 mg of residue material from the acid leach were gathered and assayed as including 12.8 mg sulfur and 0.36 mg iron. To this was added a leach solution comprising 400 ml of deionized $H_2O$, 72 ml of ammonium hydroxide, and 165.0 g of ammonium carbonate. The solution thus contained about 50% solids. The mixture was agitated for 2 hours at ambient temperature, followed by filtering and washing three times with 500 ml of deionized water.

The weight loss of the leach residue was found to be 22%. Analysis of the leach residue showed 93.4% of the sulfur had been extracted. The product was a fine bright white material.

Experiment 4—Sulfuric Acid Removal from Crude Aluminum Sulfate Crystals

As previously discussed, the filtrate from the acid extraction includes dissolved aluminum sulfate, magnesium sulfate, and other metal sulfates therein. Crude alumina sulfate slurries are generated by cooling this liquid to 10° C. After filtration, the wet crude aluminum sulfate crystals are treated with an ammonium solution, to neutralize and remove any acid therein. The procedure is as follows:

100 g of crude crystals were assayed as containing 0.28 g iron, 3.01 g aluminum, 0.32 g magnesium, and 42.12 g $SO_4$. (Based on BM-33). This material was placed in 100 ml of water and was treated with 33.3 ml of sodium hydroxide in 50 ml of water. The mixture was agitated for 5 minutes and filtered. The solids were washed three times with deionized $H_2O$ (100 ml).

The solids were reslurried with 100 ml of deionized $H_2O$ and treated with the addition of 9.6 ml of a 10% sodium hydroxide solution. The remaining solids were separated by filtration, and washed with 100 ml of deionized $H_2O$.

The sodium hydroxide solution, containing sodium aluminate ($NaAlO_2$) contain no detectable iron or magnesium and was found to contain 76.41% of the aluminum from the crude crystals.

The pH of the sodium aluminate solution was adjusted to a pH of 7.3 by bubbling $CO_2$ therethrough. At this point aluminum hydroxide precipitated, which was separated by filtration and washed. The assay of the aluminum hydroxide showed 30.3% aluminum, 0.0022% iron, 0.06% magnesium, 3.3% sulfate.

This material can be readily converted to a high quality, greater than 99% purity, alumina ($Al_2O_3$) by conventional calcining techniques.

It will be understood that while certain specific embodiments of the present invention have been described and shown, the invention is not intended to be limited to the particular steps or processes described, except as limited by the following claims.

What is claimed and desired to be secured by patent is as follows:

1. A method of processing fly ash material having bulk silicates, magnesium, magnetic iron and aluminum components therein; said method including the steps of:
   (a) removing a magnetic component of said fly ash material by a magnetic separation to leave a non-magnetic component; said magnetic component including iron component therein;
   (b) extracting the non-magnetic component from step (a) with sulfuric acid leach under reflux at atmospheric pressure, to form a sludge residue and a hot sulfuric acid liquor; said hot sulfuric acid liquor having the magnesium and aluminum components dissolved therein;
   (c) separating the sludge residue and the hot sulfuric acid liquor form step (b);
   (d) subjecting the sludge residue from step (c) to an aqueous ammonium carbonate extraction to form an aqueous solution having a white precipitate therein;
   (e) separating the white precipitate of step (d) from the aqueous solution;
   (f) cooling, without acid neutralization, the hot sulfuric acid liquor from step (b) to precipitate a crude solid including ammonium sulfate and magnesium sulfate from the resulting cooled acid liquor;
   (g) separating the cooled acid liquor and the crude solid precipitate of step (f) without acid neutralization of the cooled acid liquor;
   (h) extracting the crude solid precipitate from step (g) with an aqueous ammonium solution to form a nonacidic solid precipitate including crude aluminum hydroxide and magnesium hydroxide and an aqueous solution including ammonium sulfate;
   (i) separating the aqueous solution including ammonium sulfate from the solid precipitate of step (h);
   (j) extracting the solid precipitate from step (i) with aqueous sodium hydroxide to form an aqueous sodium hydroxide solution including aluminum hydroxide dissolved therein, and an insoluble solid residue including magnesium hydroxide;
   (k) separating the aqueous sodium hydroxide solution from the insoluble solid residue of step (j); and,
   (l) precipitating aluminum hydroxide from said aqueous sodium hydroxide solution of step (k).

2. The method of claim 1 wherein said step (h) of extracting includes dissolving solid precipitate from step (g) in water to form a crude mixture, and mixing said crude mixture with an aqueous ammonium solution.

3. The method according to claim 1 wherein said step (h) of extracting includes washing said precipitate with an aqueous ammonium solution.

4. The method according to claim 1 including a step of calcining the aluminum hydroxide from step (1) to form alumina.

5. A method of processing fly ash material having bulk silicates, magnesium, magnetic iron and aluminum components therein; said method including steps of:
   (a) removing a magnetic component of said fly ash material by a magnetic separation to leave a non-magnetic component; said magnetic component including the iron component therein;
   (b) extracting the non-magnetic component from step (a) with sulfuric acid leach under reflux at atmospheric pressure, to form a sludge residue and a hot sulfuric acid liquor; said hot sulfuric acid liquor having the magnesium and aluminum components dissolved therein;
   (c) separating the sludge residue and the hot sulfuric acid liquor from step (b);
   (d) subjecting the sludge residue from step (c) to an aqueous ammonium carbonate extraction to form an aqueous solution having a white precipitate therein;
   (e) separating the white precipitate of step (d) from the aqueous solution;
   (f) cooling, without acid neutralization, the hot sulfuric acid liquor from step (b) to precipitate a crude solid including ammonium sulfate and magnesium sulfate from the resulting cooled acid liquor;
   (g) separating the cooled acid liquor and the crude solid precipitate of step (f) without acid neutralization of the cooled acid liquor;
   (h) subjecting the crude precipitate from step (g) to a precipitation from aqueous ethanol solution to form a non-acidic solid precipitate including crude aluminum hydroxide and magnesium hydroxide, and an aqueous solution;
   (i) separating the aqueous solution and solid precipitate from step (h);
   (j) extracting the solid precipitate from step (i) with aqueous sodium hydroxide to form an aqueous sodium hydroxide solution including aluminum hydroxide dissolved therein, and an insoluble solid residue including magnesium hydroxide;
   (k) separating the aqueous sodium hydroxide solution from the insoluble solid residue of step (j); and,
   (l) precipitating aluminum hydroxide from said aqueous sodium hydroxide solution of step (k).

* * * * *